United States Patent [19]

Engelmann et al.

[11] 4,456,735

[45] Jun. 26, 1984

[54] CONTINUOUS PROCESS FOR THE PRODUCTION OF VINYL CHLORIDE POLYMERS IN AQUEOUS SUSPENSION

[75] Inventors: Manfred Engelmann, Burghausen; Heinz Klippert; Eberhard Tzschoppe, both of Burgkirchen, all of Fed. Rep. of Germany

[73] Assignee: Hoechst Aktiengesellschaft, Fed. Rep. of Germany

[21] Appl. No.: 406,219

[22] Filed: Aug. 9, 1982

[30] Foreign Application Priority Data

Aug. 17, 1981 [DE] Fed. Rep. of Germany ....... 3132421

[51] Int. Cl.$^3$ .......................... C08F 14/06; C08F 2/20
[52] U.S. Cl. ...................................... 525/317; 526/62; 526/65; 526/73; 526/74; 526/200; 526/202; 526/210
[58] Field of Search ..................... 525/317; 526/65, 73

[56] References Cited

U.S. PATENT DOCUMENTS 3,004,013 10/1961 Kircher, Jr. .......................... 526/65
3,678,021 7/1972 Chatelain .............................. 526/65
3,879,364 4/1975 Kemp .................................... 526/65

FOREIGN PATENT DOCUMENTS 350798 9/1972 U.S.S.R. ................................ 526/65

*Primary Examiner*—C. A. Henderson
*Attorney, Agent, or Firm*—Connolly and Hutz

[57] ABSTRACT

The process is described for the continuous suspension polymerization of vinyl chloride in aqueous phase, in which the polymerization mixture is subjected, in 2 zones, to treatment employing different process parameters in respect of final conversion, dwell time, number of theoretical cascade stages and stirrer power applied. This procedure gives, at good space-time yields, very uniform products which have a narrow particle size distribution, a high bulk density, good flow and a low speck count. In spite of using standard kettle material, only a very low formation of deposit on the kettle walls is observed.

12 Claims, No Drawings

CONTINUOUS PROCESS FOR THE PRODUCTION OF VINYL CHLORIDE POLYMERS IN AQUEOUS SUSPENSION

BACKGROUND OF THE INVENTION

1. Field of the Invention

The invention relates to a continuous process for the production of vinyl chloride polymers in aqueous suspension.

2. Description of the Prior Art

Vinyl chloride has already been polymerized in an aqueous dispersion on a large industrial scale for many years. Whereas polymerization in an aqueous emulsion in the presence of water-soluble emulsifiers and activators has already been carried out continuously from the start of technical development and, even today, this process is largely used in the art, the discontinuous (batchwise) polymerization process has hitherto been preferred for the polymerization of vinyl chloride in aqueous suspension in the presence of water-soluble suspending agents (protective colloids) and oil-soluble activators. As a result of the continuous increase in the sales of the tonnage plastic polyvinyl chloride and as a result of competition with other tonnage plastics, there has already existed for some years a necessity to produce on an increasingly cheaper basis and an opportunity to produce on an increasingly larger scale. In a trend of this kind the production of polyvinyl chloride in aqueous suspension by a continuous process has advantages, since such a process usually enables better space-time yields to be achieved than a discontinuous process, and the disadvantage of a continuous process, that it is relatively sluggish when changes of grade are made, becomes increasingly less important in view of the increasingly greater prospects for the sales of a single grade.

Although, as a result of industrial application over a period of many years, a whole series of processes and process improvements are known for the continuous emulsion polymerization of vinyl chloride, technical development for suspension polymerization has hitherto proceeded mainly in the direction of continuing batchwise production but in increasingly larger units. The principal reason for this is perhaps that the techniques which are known for continuous emulsion polymerization cannot be applied directly, ie. not on the basis of the considerations which are familiar to the expert, to a corresponding continuous suspension polymerization process.

Among the developments made hitherto in the field of continuous suspension polymerization of vinyl chloride U.S. Pat. No. 3,007,903 discloses a process in which polymerization is carried out in a large number, preferably 5 to 10, of zones arranged in tandem. These zones are represented by a corresponding number of stirred kettles, and the reaction medium overflows from one kettle into the next kettle located below it. The zones can also be sections of a tubular reactor. An inert gas is passed through the various zones, co-current with the polymerization liquor, in order to prevent obstruction of the transitions from one zone into another zone.

German Auslegeschrift No. 1,116,410 discloses a continuous suspension polymerization process for vinyl compounds in which the dispersion of the monomer(s) in the aqueous liquor and the subsequent polymerization are carried out in a number of mechanically stirred conversion zones arranged one above the other. A reaction chamber is used for this purpose, comprising a vertical pressure vessel, the diameter of which is substantially less than its height and which has, located in its vertical axis, a continuous axle carrying three or more impeller wheels which act radially. These impeller wheels are arranged at decreasing distances from one another, passing down the axle, so that the lowest degree of agitation required to comminute the monomer into droplets of the desired size and to maintain a suspension is just achieved. Several vertical baffle plates facing inwards, or similar devices, are advantageously fitted on the inner wall of the reaction vessel, the width of these being about 1/10 to 1/12 of the diameter of the reaction vessel. The baffle plates are offset from one another by an angle of about 90° and serve the purpose of increasing the frictional resistance of the suspension in the reaction vessel.

Furthermore, German Auslegeschrift No. 1,217,069 discloses an apparatus for the continuous polymerization of ethylenically unsaturated polymerizable compounds, also including vinyl chloride, which comprises a reaction space which has rotational symmetry and which is sub-divided into chambers by elements having rotational symmetry, the chambers being connected to one another by small apertures and flow of the reaction material being possible only in the main direction of flow of the polymerization material.

In the simplest case the elements having rotational symmetry are disks, separated from the walls of the reaction space by narrow annular gaps. These disks are fixed on a rotating transmission shaft at intervals which are chosen to suit the requirements of a particular case. An attached drawing shows disk spacings which increase in the direction of flow of the polymerization material, the length/diameter ratio of the chambers separated by the disks being about 0.1 to 0.6. A paddle stirrer is mounted on the rotating axle in the last chamber in the direction of flow. The apparatus is described as particularly suitable for emulsion polymerization, but is stated to be also applicable for polymerization in aqueous suspension.

A further apparatus, in particular for the continuous suspension polymerization of vinyl chloride, is disclosed in German Auslegeschrift No. 2,343,788. It comprises a central, tubular reaction space and a shaft which passes vertically through this space, the reaction space being divided into chambers by separating elements and the chambers being connected with one another by small apertures in the separating elements. These chambers carry ring lines, one of which is in each case connected to a chamber by means of two apertures. Stirring elements can be mounted in all the chambers on the shaft passing through the latter. The elements which separate the chambers in the central reaction space from one another are advantageously fixed to the walls of this reaction space and leave an aperture free in the center through which passes the shaft to which the stirring elements are fastened. It is stated to be advantageous to use 5 to 30 stages (chambers plus ring line). The attached drawing shows an apparatus having 9 chambers, of which 7 have ring lines. An illustrative embodiment describes the polymerization of vinyl chloride in an apparatus corresponding to the drawing and containing no stirring elements on the continuous shaft. The entire apparatus is generally made of stainless steel In this connection, care is taken that the internal surfaces produced are as smooth as possible, in order not to form starting points for deposition.

As can be seen from the publications mentioned first and last, deposition on the walls constitute a problem in the continuous suspension polymerization of vinyl chloride. In the process first mentioned, attempts are made to keep at least the points most sensitive to obstruction, the connecting pipes, free by blowing as through them. This method is not suitable for operation substantially without wall deposits in the reaction spaces too, or for avoiding the difficulties caused thereby, such as impairment of heat transfer, contamination of the polymer by coarse particles, and the like. In addition, in the case of polymerization batches which have a tendency to foam as a result of an increased content of surface-active substances, blowing gas through can lead to considerable difficulties. In the second and third of the processes mentioned, the problem of wall deposits is not discussed at all, but they certainly occur in the reactor equipped with baffle plates and in the chambers in the reactor which are sub-divided by the disks and they render a laborious cleaning operation necessary. Similar considerations apply to the apparatus according to the fourth publication described, which is in any case fairly expensive. In this case although it is stated that deposits are prevented by means of smooth internal surfaces and cleaning of the reactor is reported not to be necessary, it is stated subsequently that nevertheless occasionally some wall deposit can be formed, which is removed by having to shut down the whole apparatus and to clean it with the aid of a solvent, for example tetrahydrofuran. Considerable quantities of solvent are required for this purpose in the case of a large industrial plant, which have to be stored separately and recovered, which, as well as the outlay, in itself considerable, required for the comparatively complicated polymerization apparatus, also means, besides, an additional outlay in respect of process technology.

In respect of German Auslegeschrift No. 1,116,410, a comparison, described later in the text, of the polymerization process described by means of the examples in that publication with the process of the present invention shows that, even under favorable circumstances, only an appreciable lower space-time yield can be achieved. Reference has already been made earlier in the text to the formation of a deposit. It has been found that the formation of deposit increases markedly at higher rates of shear. The latter certainly occur in the process of German Auslegeschrift No. 1,116,410.

A continuous process for the preparation of a vinyl chloride polymer in aqueous suspension has also already been suggested, in which the reaction is carried out in at least two reaction zones in which the polymerization mixture is kept sufficiently in agitation for the polymer formed not to be deposited. In the first reaction zone polymerization is carried out to a conversion of 3 to 10% by weight, relative to monomers employed. Plug flow of the polymerization mixture is maintained in all the reaction zones, the polymerization mixture is agitated in the first reaction zone in a manner sufficient to obtain the particle morphology desired, and, particularly in the second reaction zone, polymer deposits are prevented from forming on the surfaces which come into contact with the polymerization mixture. This process offers a number of advantages compared with the processes previously mentioned, for example only slight formation of deposits and improved space-time yield. Although the product obtained thereby already has good properties, there is a constant desire to improve even good properties still further. The present invention is based on the subject of improving further the processes known hitherto for the continuous suspension polymerization of vinyl chloride and the pattern of properties of the products obtained thereby.

SUMMARY OF THE INVENTION

This object is achieved by means of a continuous process for the production of a vinyl chloride polymer by homopolymerization, copolymerization, or graft polymerization of vinyl chloride, if appropriate in the presence of one or more monomers which can be copolymerized with vinyl chloride and/or one or more polymers which can be graft polymerized with vinyl chloride, in aqueous suspension and in the presence of one or more activators which decompose to form free radicals, suspending agents, if appropriate other surface-active substances and further additives, in at least two zones, the mixture being cooled, released from pressure and freed from unreacted monomers after leaving the last zone and, after the removal of the bulk of the aqueous liquor, being processed to give a dry polymer powder, which comprises agitating the polymerization mixture in the first zone at a volume-specific stirrer power of 0.6 to 6 $kWm^{-3}$ until a vinyl chloride monomer conversion of 0 to 3% by weight has been reached, in an apparatus, at a number of theoretical cascade stages of 3 to 20 and at average dwell times of the polymerization mixture of 5 to 60 minutes, and agitating the polymerization mixture in the second zone at a volume-specific stirrer power of 0.01 to 0.6 $kWm^{-3}$ in an apparatus, at a number of theoretical cascade stages of 10 to 100 and carrying out polymerization at temperatures of 40° to 80° C. until a conversion of 70 to 98% by weight has been reached.

DETAILED DESCRIPTION

The invention is based on the surprising fact that important improvements are achieved if specific process parameters are maintained in the zone in which the dispersion of the monomer(s) in the aqueous liquor essentially takes place, these parameters differing markedly from those which should be maintained in the zone in which by far the greatest part of the actual polymerization takes place.

The two zones can be in a common vessel in which they are appropriately sub-divided from one another by means of a separating wall which has a passage orifice which is narrow in comparison with the whole cross-section of the vessel. However, it is advantageous for the two zones to be in vessels separated from one another, each described as "apparatus", it being possible for each apparatus on its own in turn to be composed of one or more vessels. The apparatus used for the first zone preferably comprises one or two vessels. The apparatus for the second zone preferably comprises one to five vessels, all the vessels in turn being arranged in tandem and being connected to one another by means of pipes. The apparatus used for the first zone can advantageously also comprise one vessel which is divided by transverse walls into compartments of the same or different sizes, each transverse wall having at least one aperture, the cross-section of which is only a fraction, say 1/10 to 1/100, of the total cross-section of the vessel.

In the first zone, the polymerization mixture should have either no conversion at all or at most a conversion of up to 3% by weight, preferably 0 to 0.5% by weight. The numerical figures are to be understood as percentage by weight of polymer formed, relative to the weight of the monomer(s) employed. Above a conversion of as little as 3% by weight, a distinct formation of wall deposit is observed, which can admittedly be diminished by means of customary agents for preventing a deposit, but cannot be prevented and which grows with increasing severity as the conversion in the first zone rises. In addition, the polymer produced contains an increased number of specks (fish eyes). In a preferred embodiment of the invention, the polymerization mixture in the first zone is maintained at temperatures which are between 15° C. and a temperature 10° C. less than the polymerization temperature used in the second zone. In general, below 15° C. an unnecessary outlay on cooling is required. At temperatures which are less than 10° C. below the polymerization temperature, the conversion of the polymerization mixture observed in the first zone is too high. At fairly long average dwell times of the polymerization mixture in zone 1 (about 20 to 60 minutes), it is advisable to keep the mixture at temperatures which are more than 10° C. (about 15° to 20° C.) below the polymerization temperature. It is advantageous to feed the components of the mixture into the first zone at about room temperature, the mixture in this zone becomes warmed by the stirring energy introduced, so that, in general, the polymerization mixture has a higher temperature when it leaves the first zone than when it is fed in. This effect can be curbed by cooling or intensified by additional warming. However, at no point in zone 1 should the temperature of the reaction mixture be outside the zone indicated earlier in the text.

The average dwell time of the polymerization mixture in the first stage should be 5 to 60 minutes, preferably 10 to 30 minutes and, especially, 15 to 20 minutes. It is determined as described later in the text in the methods of measurement. At an average dwell time less than 5 minutes, the observed particle size distribution of the polymer produced is too broad and increased formation of coarse particles and polymer grit is observed. The upper limit of the average dwell time is set essentially by economic considerations. Above 60 minutes, no improvement in the effects according to the invention takes place and an unnecessary impairment of the space-time yield must be accepted.

In the first zone, the polymerization mixture should be agitated at a volume-specific stirrer power of 0.6 to 6, preferably 1 to 3, $kWm^{-1}$. At a volume-specific stirrer power less than 0.6 $kWm^{-3}$ adequate mixing of the polymerization components does not take place, particularly at fairly short dwell times, increased formation of wall deposits is observed in the second zone and there are irregularities in the polymerization which takes place there which can lead to the formation of compact blocks of polymer. At a fairly long time of operation, the polymer deposits on the walls and stirrer can become so thick that they grind on one another, whereby larger and smaller fragments are torn off. The "ground grit" thus formed contaminates the polymer which is formed and can result in impediments when the polymerization mixture is flowing through zone 2 and when the finished, polymerized dispersion is discharged from this zone. If a volume-specific stirrer power of more than 6 $kWm^{-3}$ is introduced into zone 1, the polymer formed is too fine and exhibits poor flow, in addition there is a risk that the polymerization mixture in the first zone will be warmed too much, which either requires an increased cooling outlay or there is a risk that the polymerization conversion achieved will be too high, whereby the difficulties described earlier in the text will then occur.

The polymerization mixture should pass through 3 to 20, preferably 5 to 10, theoretical cascade stages in the first zone. The number of theoretical cascade stages is determined on the apparatus which is used for the first zone by the method of Patat-Kirchner "Praktikum der technischen Chemie" ("Practical manual of industrial chemistry"), as described later in the text in the methods of measurement. During the determination, the measurement liquid must be agitated at the same volume-specific stirrer power as is applied later to the polymerization mixture. The flow conditions in the determination should be adjusted to the values encountered in use. At a number of theoretical cascade stages less than 3 too broad a particle size distribution, an increased number of specks (fish eyes) and coarse particles will be observed in the polymer produced. Above a number of theoretical cascade stages of 20, no further advantageous effect will be observed which would justify the capital expenditure, which increases as the number of theoretical cascade stages grows, and the falling space-time yields.

Particularly good results are obtained if the number of theoretical cascade stages and the average dwell time of the polymerization mixture in the first zone are adjusted to values such that the product of the two quantities is 30 to 300 minutes, in particular 50 to 150 minutes.

In the second zone, the polymerization mixture is polymerized to a conversion of 70 to about 98% by weight. At a conversion less than 70% by weight, comparatively large quantities of residual monomer remain in the polymerization mixture, and these have to be removed from the mixture with an unnecessarily high outlay of energy and have to be recovered and recycled. In polymerization mixtures containing a high proportion of surface-active substances, if there are large quantities of unreacted monomers to be removed, difficulties can, in addition, be caused by foaming and longer degassing times are required. At a conversion above 98% by weight, an increasing formation of glassy particles and a considerable increase in the speck (fish eyes) count are observed in the polymer produced. In addition, long polymerization times are required in order to reach such high conversions. Polymerization in the second zone is preferably carried out until a conversion of 80 to 95% by weight, particularly 85 to 90% by weight, has been reached. The percentage figures for the conversion are to be understood as the percentage by weight of polymer produced, relative to monomers employed. If polymers are added to the polymerization mixture as base for grafting, the quantity thereof should be deducted from the total quantity of polymer produced before calculating the conversion.

The polymerization mixture is agitated in the second zone at a volume-specific stirrer power of 0.01 to 0.6 $kWm^{-3}$, preferably 0.02 to 0.2 $kWm^{-3}$. If a volume-specific stirrer power less than 0.01 $kWm^{-3}$ is used, demixing phenomena are observed, the quality of the product becomes non-uniform and the heat produced in the polymerization cannot be removed to the extent desired, which makes it difficult to maintain the polymerization temperature constant. Above 0.6 $kWm^{-3}$ an unfavorably broad particle size distribution and increased proportions of coarse particles are observed in the polymer produced. In addition, there is an increased formation of deposit in the second zone on those parts of the apparatus which come into contact with the polymerization mixture.

In the second zone, polymerization is carried out in an apparatus at a number of theoretical cascade stages of 10 to 100. The number of theoretical cascade stages is determined as described in greater detail later in the text. If the number of theoretical cascade stages is less than 10, the polymer produced exhibits a poorer intrinsic color, a less favorable heat stability and an increased number of glassy particles and speckes (fish eyes); in addition it is more difficult to free it from unreacted monomers. A number of theoretical cascade stages higher than 100 requires an unnecessarily complicated apparatus with a correspondingly increased capital cost, without the latter being justified by a corresponding improvement in product quality and/or yield. It is preferable to carry out the reaction in an apparatus at a number of theoretical cascade stages of 15 to 50, particularly 20 to 40.

In principle, it is possible, during the whole process according to the invention, to use agents for preventing deposits on the walls of the parts of the apparatus which come into contact with the polymerization mixture. Such agents are in themselves known and comprise either special design of the surface of the parts of the apparatus in respect of surface smoothness (for example an average peak-to-valley height less than 10 $\mu$m) or in respect of the material of the surface which comes into contact with the polymerization mixture (for example glass, enamel, nickel or a large number of coatings employing organic and/or inorganic substances), or additives to the polymerization mixture, in most cases additives which are soluble in water. Occasionally both measures (special design of the surface and additives to the polymerization mixture) are also used together. From the large number of known methods for preventing deposits, only the following will be mentioned here as examples: German Offenlegungsschriften Nos. 1,946,474, 2,631,325, 2,739,708, 2,745,085, 2,752,772, 2,804,076, 2,807,180, and 2,811,000; Belgian Pat. No. 845,012 and U.S. Pat. No. 3,926,910. If the agents used comprise a special design of the surface with which the polymerization mixture in the apparatus comes into contact, these agents are preferably not used until the second zone in the process according to the invention. It is not necessary to use them also in the first zone, since as a rule no deposits are formed here in any case. A measure of this kind would only render the process unnecessarily complicated and expensive.

In the second zone, the polymerization is carried out at temperatures of 40° to 80° C., preferably 45° to 75° C. The pH value of the polymerization mixture should be between 2 and about 10. In general, polymerization is carried out under the autogeneous pressure of the vinyl chloride at the temperature selected, but it is also possible for inert gases, for example nitrogen, to be present in the gas space above the polymerization mixture.

As already stated above, the apparatus used in the first zone or in the second zone can comprise several individual vessels or reactors. In order to increase the number of theoretical cascade stages, one or more of these vessels can be sub-divided into several chambers by transverse walls having a relatively narrow aperture. Disk stirrers are examples of stirrers which are used for the apparatus employed in the first zone. These are stirrers containing, mounted on a common axis, disks which are disposed perpendicularly to the axis and at identical or different distances above one another and which, in turn, contain several, in most cases 4 to 8, blades which are mounted perpendicularly or diagonally to the surface of the disks and which in most cases project beyond the circumference of the disk. It is also possible to use paddle stirrers containing, on one axis, a ring of paddles or several rings of paddles which are arranged at intervals above one another and which in most cases comprise 2 to 8 paddle blades in which the longitudinal edges run radially, perpendicular to the paddle axis and the faces of the blades are either arranged in the direction of the paddle axis or at a specific angle, for example 45°, to the paddle axis. The latter form of stirrer is preferably employed in conjunction with the transverse separating walls described earlier in the text, a ring of paddles operating in each of the spaces sub-divided by the transverse walls. In the apparatus used for the first zone, it can also be advantgeous to employ so-called flow breakers, for example metal sheets in which the longitudinal edge runs in the direction of the axis of the vessel and the face extends radially, starting from the wall of the vessel, towards the central axis of the vessel.

The apparatus used for the second zone can advantageously contain flat blade stirrers, ie. stirrers comprising in most cases an oblong, substantially rectangular metal sheet, the stirrer axis coinciding with the major axis of the rectangle. It is not advantageous to use flow breakers in the apparatus for the second zone.

After leaving the second zone, the polymerization mixture is cooled by known processes, for example in a heat exchanger, and is released from pressure and substantially freed from unreacted monomers still present; the polymer which has been formed is separated from the bulk of the aqueous liquor and is dried, it being also possible additionally to employ measures for the further removal of unreacted monomers during or after drying.

The process according to the invention is suitable for the continuous polymerization of vinyl chloride in aqueous suspension in the presence of 0 to 30% by weight, relative to monomers employed, of monomers which are copolymerizable with vinyl chloride, good results being achieved in the presence of 0 to 15% by weight of copolymerizable monomers.

The process can also be used for the graft copolymerization of vinyl chloride, it being possible for other copolymerizable monomers also to be present as well as vinyl chloride. In this case 0.1 to 15% by weight, preferably 1 to 10% by weight, of polymers which can be graft copolymerized with vinyl chloride are employed.

The preparation, according to the invention, of the vinyl chloride homopolymers, copolymers or graft copolymers is carried out in the presence of 0.001 to 3% by weight, preferably 0.01 to 0.3% by weight, relative to monomers, of catalysts which form free radicals, such as, for example, diaryl and diacyl peroxides, such as diacetyl peroxide, acetylbenzoyl peroxide, dilauroyl peroxide, dibenzoyl peroxide, bis-2,4-dichlorobenzoyl peroxide or bis-2-methylbenzoyl peroxide; dialkyl peroxides, such as ditert.-butyl peroxide, per-esters, such as tert.-butyl percarbonate; tert.-butyl peracetate, tert.-butyl peroctoate or tert.-butyl perpivalate; dialkyl peroxy-di-carbonates, such as diisopropyl, diethylhexyl, dicyclohexyl or diethylcyclohexyl peroxy-dicarbonates; mixed anhydrides of organic sulfo per-acids and organic acids, such as acetylcyclohexylsulfonyl peroxide; azo compounds which are known as polymerization catalysts, such as azoisobutteronitrile, and mixtures of different catalysts.

Polymerization is also carried out, if appropriate, in the presence of 0.01 to 1% by weight, preferably 0.05 to 0.3% by weight, relative to monomers, of one or more of the customary suspending agents (protective colloids), such as, for example, polyvinyl alcohol, cellulose derivatives, such as water-soluble methylcellulose, carboxymethylcellulose, hydroxyethylcellulose and methylhydroxypropylcellulose, and gelatine, and also copolymers of maleic acid or its half-esters with styrenes and polyvinylpyrrolidone and copolymers of vinyl acetate and vinylpyrrolidone.

It is preferable to carry out polymerization by the process according to the invention in the presence of 0.05 to 3.0% by weight, relative to monomers employed, of at least one polyvinyl alcohol which contains acetate groups and which has a saponification number of 140 to 560, in particular 140 to 480, and a weight average molecular weight of 10,000 to 100,000, the quantity of this polyvinyl alcohol or polyvinyl alcohol mixture making up 100 to 50% by weight, relative to the quantity of all the agents present in the polymerization. If less than 100% by weight of polyvinyl alcohols containing acetate groups are employed, the quantity required to make up 100% by weight can comprise one or more of the suspending agents mentioned earlier in the text.

If one or more polyvinyl alcohols which contain acetate groups and which have a saponification number higher than 300 are employed, the quantity thereof should at the most be only 50% by weight of the total quantity of all the suspending agents present in the polymerization. The remaining 50% minimum can contain one or more polyvinyl alcohols which contain acetate groups and have a saponification number of less than 300 and/or one or more of the suspending agents mentioned earlier in the text.

As a result of the preferred use, described in the two last paragraphs, of polyvinyl alcohols containing acetate groups as the suspending agent, an increased porosity of the particles of the polymer produced is achieved and less formation of deposit is observed in the polymerization.

In addition to the suspending agents mentioned, it is possible to carry out the polymerization in the presence of 0.01 to 1% by weight, relative to monomers, of one or more emulsifiers, the emulsifiers being employed as a mixture with the abovementioned suspending agents.

The emulsifiers used can be anionic, amphoteric, cationic and non-ionic. Examples of suitable anionic emulsifiers are alkali metal salts, alkaline earth metal salts and ammonium salts of fatty acids, such as lauric, palmitic or stearic acid, of acid fatty alcohol sulfuric acid esters, of paraffinsulfonic acids, of alkylarylsulfonic acids, such as dodecylbenzenesulfonic or dibutylnaphthalenesulfonic acid or of dialkyl esters of sulfosuccinic acid, and the alkali metal salts and ammonium salts of fatty acids containing epoxy groups, such as epoxystearic acid, or of reaction products of per-acids, for example peracetic acid, with unsaturated fatty acids, such as oleic or linoleic acid, or unsaturated hydroxy fatty acids, such as ricinoleic acid.

The following are examples of suitable amphoteric or cationic emulsifiers: alkylbetaines, such as dodecylbetaine, and alkylpyridinium salts, such as laurylpyridinium hydrochloride, and also alkylammonium salts, such as oxethyldodecylammonium chloride. The following are examples of suitable non-ionic emulsifiers: partial esters of fatty acids with polyhydric alcohols, such as glycerol monostearate, sorbital monolaurate or sorbitol monooleate; polyoxyethylene esters of fatty acids or aromatic hydroxy compounds; and polypropylene oxide/polyethylene oxide condensation products.

In addition to catalysts, suspending agents (protective colloids) and, if appropriate, emulsifiers, the polymerization can be carried out in the presence of buffer substances, for example alkali metal acetates, borax, alkali metal phosphates, alkali metal carbonates, ammonia or ammonium salts of carboxylic acids, and molecular size regulators, such as, for example, aliphatic aldehydes having 2 to 4 carbon atoms, chlorinated or brominated hydrocarbons, such as, for example, dichloroethylene, trichloroethylene, chloroform, bromoform and methylene chloride, and mercaptans.

Examples of further suitable polymerization auxiliaries are to be found in H. Kainer "Polyvinylchlorid und Vinylchlorid-Mischpolymerisate" ("Polyvinyl chloride and vinyl chloride copolymers"), 1965 edition, pages 13 to 34.

One or more of the following monomers are suitable for the copolymerization with vinyl chloride, for example: vinyl esters of straight-chain or branched carboxylic acids having 2 to 20, preferably 2 to 4, carbon atoms, such as vinyl acetate, propionate, butyrate or 2-ethylhexoate, or vinyl esters of isotridecanoic acid; vinyl halides, such as vinyl fluoride, vinylidene fluoride or vinylidene chloride, vinyl ethers, vinylpyridine, unsaturated acids, such as maleic, fumaric, acrylic or methacrylic acid and monoesters or diesters thereof with monoalcohols or dialcohols having 1 to 10 carbon atoms; maleic anhydride; maleimide and N-substitution products of the latter with aromatic, cycloaliphatic and, if appropriate, branched, aliphatic substituents; acrylonitrile and styrene.

Examples of polymers which can be used for the graft copolymerization are crosslinked or non-crosslinked elastomeric polymers which are obtained by polymerizing one or more of the following monomers: dienes, such as butadiene or cyclopentadiene; olefins, such as ethylene or propylene; styrene; unsaturated acids, such as acrylic or methacrylic acid, and esters thereof with monoalcohols or dialcohols having 1 to 10 carbon atoms, acrylonitrile, vinyl compounds, such as vinyl esters of straight-chain or branched carboxylic acids having 2 to 20, preferably 2 to 4, carbon atoms, and vinyl halides, such as vinylidene chloride and vinyl chloride. The latter, however, can only be used with at least one of the monomers previously mentioned.

One or more of the following substances can be added during the polymerization, if appropriate while maintaining the filled volume of the polymerization vessel constant: water, aqueous solutions, monomers, catalysts, co-catalysts and further polymerization auxiliaries, such as, for example, regulators, buffer substances, emulsifiers and suspending agents.

Pulverulent polymers obtained by the process according to the invention can, like hitherto customary suspension polymers of vinyl chloride, be processed by thermoplastic methods, for example by extrusion, injection molding or calendering.

The process according to the present invention makes it possible to prepare, without problems and with very good space-time yields, suspension polymers which have a major content of polymerized vinyl chloride units and which are distinguished, even over prolonged periods of production, by a constant good pattern of properties, such as narrow particle size distribution, good flow, low proportion of coarse particles, low speck count and high bulk density. The new process is also not very susceptible to the formation of deposits on the parts of the apparatus which come into contact with the polymerization mixture, as a result of which it is generally possible to carry out the reaction in customary steel vessels having no special surface coating which hinders the transfer of heat from the polymerization mixture to the wall of the vessel.

The examples which follow are intended to illustrate the invention in greater detail. The experimental values quoted were determined as follows:

Stirrer power

The measured power input of the stirrer motor under load, less the power input without load, is divided by the volume of the stirred polymerization mixture.

Conversion

In the preceding description, the conversion is quoted in each case on leaving a zone. This is determined by analysis from the quantity of polymer formed, divided by the quantity of monomers originally employed. If polymers are co-used as a base for grafting, the quantity thereof should be deducted from the quantity of polymer formed in total.

Average dwell time

The average volume of polymerization mixture present in a particular zone at any desired point in time while the process is carried out, is divided by the volume of polymerization mixture introduced into this zone in the time unit.

Number of theoretical cascade stages

This is determined on the particular apparatus, with the stirrer running, before carrying out the process according to the invention, the volume-specific stirrer energy introduced into the agitated medium being adjusted to such a figure that it agrees with the energy to be applied subsequently in the process according to the invention. In other respects the procedure followed is as described in Patat-Kirchner "Praktikum der technischen Chemie" ("Practical manual of industrial chemistry"), 3rd edition (1975), Walter de Gruyter-Verlag, Berlin/New York, page 188, with the difference that an aqueous solution containing 0.6% by weight of sodium chloride is initially introduced into the apparatus and a constant volume flow of distilled water is metered in. A WTW, type LF 39 conductivity meter is used to determine the change in conductivity or salt concentration as a function of the time. The number of theoretical cascade stages is determined graphically, ie. by comparing the dwell time/distribution curve determined experimentally with the arithmetically calculated dwell time/distribution curves for numbers of theoretical cascade stages from 1 to 100 (in this context see loc.cit., page 186).

Quantity of deposit:

After the completion of each test, the reactors are emptied and treated with tetrahydrofuran until the coatings on the walls have obviously been dissolved off. The solvent is evaporated off from the tetrahydrofuran solution thus obtained, and the residue is weighed. K-value: Determined as specified in DIN No. 53,726; solvent: cyclohexanone.

Bulk density

As specified in DIN No. 53,468.

Particle size

As specified in DIN No. 53,734.

Specks (fish eyes)

The number of specks is determined as follows:
210 g of vinylchloride polymer,
84 g of di-2-ethylhexyl phthalate,
3 g of titanium dioxide (rutile grade)*),
3 g of barium/cadmium laurate (stabilizer BC 12 made by CIBA-GEIGY)*),
5.7 g of di-2-ethylhexyl phthalate*) and
0.3 g of phthalocyanine Blue (Heliogenblau 6902 K made by BASF)*)

(*) In the form of a ground paste are intimately mixed. A milled hide is prepared from this mixture at a roll temperature of 160° C. and is taken off after 10 minutes at a thickness of 200 μm and is cooled. The hide is stretched over a lamp. The unpigmented particles in an area of 100 cm² are counted.

Flow

As specified in DIN No. 43,492; cup outlet 12 mm diameter.

Space-time yield

Determined by calculation from the total quantity of polymer produced in the total running time indicated, relative to the reaction space available for polymerization. Quoted in $Mgd^{-1}m^{-3}$.

Comparison Test A

An apparatus comprising three tubular reactors connected in tandem is used. The first reactor has a capacity of 10 l, a length (height)/diameter ratio of 10:1, its internal surfaces are composed of chrome-nickel steel (VA steel) and it is equipped with a disk stirrer which carries, on a common axle, coinciding with the reactor axis, 7 disks one over the other at equal intervals, 6 vein-like stirring elements being located on each disk at equal intervals. The stirrer is also composed of chrome-nickel steel. The second reactor is composed of carbon steel and is enamelled inside. It has a capacity of 150 l and a length/diameter ratio of 5:1 and contains an enamelled flat blade stirrer which sweeps through about 70% of the total internal space of the reactor. The third reactor has a capacity of 300 l, its internal surfaces are made of chrome-nickel steel (VA steel), its length/diameter ratio is 5:1 and it contains a flat blade stirrer, the surfaces of which are made of chrome-nickel steel and which sweeps through 85% of the internal space of the reactor. All three reactors have double jackets through which water flows as the temperature control medium. In addition, the reactors contain devices for measuring the temperature of the polymerization mixture, the pressure and the level of the liquid.

Continuous polymerization of vinyl chloride was carried out by feeding in, by means of booster pumps, the quantities indicated in the table below under A of vinyl chloride monomer, water, initiator, suspending agent and agent for preventing deposits, the latter in the form of solutions. The first reactor represents the apparatus used in zone 1, while the second and third reactors represent the apparatus used in zone 2. The appropriate process parameters are also shown in the table. The internal temperatures in the reactors were kept constant after the polymerization had started by an appropriate circulation of cooling water.

After leaving the third reactor, the polymerization mixture was released from pressure and freed from excess unreacted monomer, the bulk of the aqueous liquor was separated off in a centrifuge and the moist polymer was dried at 70° to 80° C. The experimental values shown in the table were determined on the polymer thus obtained.

After constant experimental conditions had been set up, the test was continued for 48 hours and the reactors were then emptied and the deposit formed was determined as described in greater detail above. It is also shown in the table, which, in addition, also contains for comparison purposes the product of the number of theoretical cascade stages and the dwell time in the first zone, and the approximate number of theoretical cascade stages when the polymerization mixture in the first zone had reached a conversion of not more than 3% by weight was estimated, taking into account the degree of conversion of the polymerization mixture on leaving this zone (7% by weight).

Comparison Test B

Example 1 from German Auslegeschrift No. 1,116,410 was used for this purpose. In that example an unjacketed reaction vessel having a diameter of about 20 cm and a height of 9.14 m is used. The contents of the reaction vessel are stirred by 15 horizontal radial flow impellers which have a diameter of about 10 cm and are mounted on a shaft which passes through the head of the reaction vessel and is carried on central bearings. The interval between the first 7 impellers is in each case 3 impeller diameters, then follow 3 intervals each of 4.5 times the diameter of the impeller and the interval between the remaining impellers is 6 times the diameter. The impellers each have three flat veins of dimensions 2.5×5 cm.

The quantities indicated in the table of vinyl chloride, water, initiator and suspending agent were fed continuously into the reaction vessel within a period of 34 hours. The impellers were operated at a peripheral speed of about 1.07 m.s$^{-1}$. The polymerization temperature, the average dwell time, the conversion of the polymerization mixture on leaving the reaction vessel and the estimated number of theoretical cascade stages are indicated in the table below, together with the values determined on the polymer which are recorded in German Auslegeschrift No. 1,116,410. A specific viscosity of 0.185, determined in a 0.2% strength solution in nitrobenzene corresponds to a K-value of 67, determined in cyclohexanone. The degree of conversion of the polymerization mixture on leaving the reaction vessel and the estimated number of theoretical cascade stages of this vessel were used to estimate the number of theoretical cascade stages at which, in the vessel, the reaction mixture had a conversion of about 3%, and from this the product of the number of theoretical cascade stages multiplied by dwell time was obtained and is listed in the table for composition purposes.

Examples 1 and 2

The process according to the invention was carried out by using, for zone 1, an apparatus comprising two tubular vessels connected in tandem, each of which had an internal diameter of 100 mm, an internal height of 1,200 mm and a volume of 9.4 l. Each vessel contained two flow breakers in the form of an oblong rectangle of dimensions 1,200×10 mm, which were mounted at opposite points of the wall of the vessel in such a way that the long edge of the rectangle ran parallel to the axis of the vessel and the short edge of the rectangle pointed radially towards the center of the vessel. Each vessel also contained a disk stirrer, the axle of which coincided throughout with the axis of the vessel and which carried, on this axle, 5 disks separated from one another and from the head and the base of the vessel by equal distances, 8 vertical blades of dimensions 15×12 mm being mounted on each of these disks at equal distances from one another. The diameter of each disk including blades was 65 mm. Both vessels, including the internal fitments and the stirrer, were made of stainless steel (VA steel) and were connected in tandem and linked to the apparatus of zone 2 via pipes. The first reactor, in the direction of flow of the polymerization mixture, had at its head several apertures for feeding in liquid and an aperture for feeding in and removing gases. Each vessel had a double jacket through which water flowed as a temperature control medium, and also means of measuring the temperature, the pressure and the level of the liquid in the vessel. The process according to the invention was carried out in zone 2 by using an apparatus comprising three tubular vessels having an internal diameter of 250 mm, an internal height of 2,560 mm and a volume of 125.6 l. A flat blade stirrer, running the whole length, was mounted in each of these vessels, its axle coinciding with the axis of the vessel and its blade having a width of 190 mm. Each vessel and the flat blade stirrer in it was made of stainless steel (VA steel), had a double jacket through which water flowed as a temperature control medium, and contained means of measuring the temperature, the pressure and the level of the liquid in the interior. The three vessels of zone 2 were connected in tandem via pipes with the two vessels of zone 1. The finished polymerized dispersion was discharged at the end of the last vessel in the direction of flow of the polymerization mixture.

Before the start of the polymerization, the number of theoretical cascade stages was determined as described in greater detail earlier in the next, for the apparatus for zone 1 as well as for the apparatus for zone 2, separately from one another, the volume-specific stirrer power and the flow conditions being two figures such as were intended for the subsequent polymerization.

The continuous polymerization of vinyl chloride was carried out by feeding in the quantities indicated in the table below under Example 1 and 2 of vinyl chloride monomer, water, initiator, suspending agent and agent for preventing deposits, the latter in the form of solutions, at the head of the apparatus for zone 1 by means of booster pumps. After the polymerization had started, the internal temperatures in the vessels indicated in the table were kept constant by an appropriate circulation of cooling water through the double jackets of the vessels. The two stirrers of the apparatus of zone 1 were operated uniformly at such a rate that the volume-specific stirrer power listed in the table was applied to the polymerization mixture. The same applied to the 3 stirrers of the apparatus of zone 2. During the polymerization, all the vessels were kept almost completely full of polymerization mixture.

When constant reaction conditions had been set up, the polymerization was carried out for a further 48 hours, and the polymer dispersion discharged during this time at the end of the apparatus of zone 2 was cooled and processed further as described under Comparison Test A. The values determined on the finished polymer can also be seen from the table. When the polymerization was complete, the whole apparatus was emptied and the deposit formed therein was determined as described earlier in the text; the figures can be seen in the table.

Example 3

The process was carried out as described previously under Example 1 and 2, with the difference that another formulation was used for the polymerization mixture (see table under Example 3), and the polymerization in zone 2 took place in another apparatus, comprising two tubular vessels each of which had an internal diameter of 250 mm and an internal height of 3,840 mm and a volume of 188.5 l. Each vessel contained a flat blade stirrer which ran the whole length and had a blade width of 190 mm. The vessels and the stirrers were made of stainless steel (VA steel) and were connected in tandem as described above.

Before the polymerization is begun, the ethylene/vinyl acetate copolymer used in the polymerization mixture is dissolved in vinyl chloride. The process parameters used and the values determined on the finished polymer are shown in the Table under Example 3.

Example 4

The procedure was again as described previously under Example 1 and 2, but with the difference that another apparatus was used for zone 1, comprising only one tubular vessel having an internal diameter of 100 mm, an internal height of 2,615 mm and a volume of 20.5 l. This vessel contained two flow breakers in the form of two oblong rectangles of dimensions 2,615×10 mm, which were also arranged like the flow breakers in the apparatus for zone 1 in Examples 1 and 2. In addition, the vessel used in the present example contained 11 disk-shaped internal fitments which were mounted perpendicularly to the axis of the vessel in such a way that they divided the whole vessel into 12 spaces of approximately equal size. Each of these disk-shaped internal fitments was mounted flush with the wall in the vessel and contained a central aperture of diameter 14 mm. A stirrer axle of diameter 8 mm ran in the central axis of the vessel, concentric to the central connecting apertures of the disks, and through the whole vessel, carrying 12 diagonal blade stirrer elements arranged in such a way that each stirrer element operated approximately in the center of a compartment of the vessel. Each diagonal blade stirrer element comprised 8 blades arranged radially to the stirrer axle at equal intervals in such a way that the face of each blade made an angle of 45° with the stirrer axle. Each of these blades had dimensions measuring 10×25 mm, and the whole stirrer element had a diameter of 65 mm. The vessel, including the internal fitments and the stirrer, was made of stainless steel (VA steel) and it contained a double jacket through which water flowed as a temperature control medium, and contained, in each case, a device for measuring the temperature at both ends and in the center of the vessel and a device for measuring the pressure and the level of the liquid in the vessel. The same apparatus as described in Example 1 and 2 was used for zone 2. The vessel for zone 1 was connected in series with the apparatus for zone 2 via a pipe and contained at its other end several apertures for feeding in liquid and an aperture for feeding in or removing gas.

The determination of the number of theoretical cascade stages of the apparatus used and their subsequent operation for carrying out the continuous polymerization of vinyl chloride were effected as described in Example 1 and 2. The operating parameters used and the figures determined on the finished polymer are listed in the table below under Example 4.

Example 5

The procedure followed was as described above under Example 4, but another polymerization formulation was used, in which vinyl acetate was employed as a second monomer. The apparatus used were the same as those described in Example 4, but the apparatus for zone 1 did not contain diagonally inclined blades, but disks of diameter 65 mm which were arranged perpendicularly to the stirrer axle, each of which contained 8 blades of dimensions 15×12 mm arranged perpendicularly to the face of the disk at equal distances from one another.

The process parameters employed and the figures determined on the final polymer are listed in the table below under Example 5.

The abbreviations used in the table have the following meanings:

| | |
|---|---|
| VAc = | vinyl acetate |
| EVA = | ethylene/vinyl acetate copolymer containing 50% by weight of vinyl acetate units |
| PDEH = | di-2-ethylexyl peroxydicarbonate |
| BPND = | t-butyl perneodecanoate |
| CPND = | cumyl perneodecanoate |
| LPO = | Lauroyl peroxide = dilauroyl peroxide |
| DAPD = | diacetyl peroxydicarbonate |
| MHPC = | methylhydroxypropylcellulose, a 2% strength by weight aqueous solution of which has a viscosity of 50 mPa.s at 20° C. |
| PVA = | polyvinyl alcohol |
| PVA I = | a polyvinyl alcohol containing acetate groups, saponification number 270, weight average molecular weight 30,000 |
| PVA II = | a polyvinyl alcohol containing acetate groups, saponification number 270, weight average molecular weight 50,000 |
| PVA III = | a polyvinyl alcohol containing acetate groups, saponfication number 140, weight average molecular weight 100,000 |
| PVA IV = | a polyvinyl alcohol containing acetate groups, saponification number 460, weight average molecular weight 55,000 |
| SML = | sorbitan monolaurate |
| TCBM = | trichlorobromethane |
| WS = | tartaric acid |
| CS = | citric acid |

TABLE

| Conditions | Comparison tests | | Examples | | | | |
|---|---|---|---|---|---|---|---|
| | A | B | 1 | 2 | 3 | 4 | 5 |
| FORMULATION | | | | | | | |
| Vinyl chloride g.h$^{-1}$ | 25,000 | 6,800 | 25,000 | 25,000 | 25,000 | 25,000 | 25,000 |
| Comonomer-type; g.h$^{-1}$ | — | — | — | — | — | — | VAc; 2,500 |
| Graft copolymer-type; g.h$^{-1}$ | — | — | — | — | EVA; 500 | — | — |

TABLE-continued

| Conditions | Comparison tests A | Comparison tests B | Examples 1 | Examples 2 | Examples 3 | Examples 4 | Examples 5 |
|---|---|---|---|---|---|---|---|
| Initiator-type; g.h$^{-1}$ | PDEH; 37.5 | LPO: 34 | PDEH; 37.5 | BPND; 40 | CPND; 10 DAPD; 25 | CPND; 20 LPO; 25 | BPND; 30 LPO; 10 |
| Suspending agent I-type; g.h$^{-1}$ | PVA I; 45 | PVA; 17 | PVA I; 45 | PVA I; 30 | PVA I; 20 | PVA II; 25 | PVA II; 30 |
| Suspending agent II-type; g.h$^{-1}$ | — | — | — | MHPC; 4 | PVA IV; 20 | PVA III; 20 | MHPC; 5 |
| Emulsifier-type; g.h$^{-1}$ | — | — | — | — | — | SML; 2.5 | — |
| Buffer substance-type; g.h$^{-1}$ | — | — | — | — | — | NaH$_2$PO$_4$; 15 | NH$_4$HCO$_3$; 15 |
| Chain stopper-type; g.h$^{-1}$ | — | — | — | — | — | TCBM; 25 | — |
| Anti-deposit agent-type; g.h$^{-1}$ | WS; 2.4 | (2) | WS; 2.4 | CS; 5.0 | CS; 5.0 | CS; 5.0 | CS; 5.0 |
| Water g.h$^{-1}$ | 45,000 | 27,200 | 45,000 | 45,000 | 45,000 | 45,000 | 45,000 |
| ZONE I | | | | | | | |
| Conversion (% by weight) | 7 | only one zone | 0 | 0 | 0.2 | 0.4 | 0.5 |
| Temperature (°C.) | 50 | | 20 | 20 | 35 | 45 | 45 |
| Cascade stages | 2.3 | final conversion 60% | 6 | 6 | 6 | 8 | 8 |
| Average dwell time (minutes) | 8 | | 15.5 | 15.5 | 15.5 | 17 | 17 |
| Volume-specific performance, kWm$^{-3}$ | 0.3 | temperature 53° C. | 1.6 | 1.6 | 1.6 | 2.0 | 2.2 |
| Cascade stages × average dwell time (at 3% conversion) | <10[1] | cascade stages[1] 15 | 93 | 93 | 93 | 136 | 136 |
| ZONE II | | | | | | | |
| Conversion (% by weight) | 80 | average dwell time 490 minutes | 80 | 80 | 85 | 75 | 90 |
| Temperature (°C.) | 50 | | 55 | 55 | 55 | 66 | 61 |
| Cascade stages | 30 | | 36 | 36 | 34 | 36 | 36 |
| Average dwell time (minutes) | 375 | otherwise[2] | 320 | 320 | 305 | 325 | 310 |
| Volume-specific performance, kWm$^{-3}$ | 0.05 | | 0.04 | 0.04 | 0.05 | 0.05 | 0.06 |
| Space-time yield Mgd$^{-1}$m$^{-3}$ | 1.04 | 0.34 | 1.21 | 1.21 | 1.35 | 1.13 | 1.49 |
| Deposit (kg) | 0.15 | (2) | <0.02 | <0.02 | <0.02 | 0.05 | <0.02 |
| POLYMER PROPERTIES | | | | | | | |
| K-value | 72 | 67 | 70 | 69 | 70 | 57 | 60 |
| Bulk density (g.dm$^{-3}$) | 430 | 500 | 490 | 550 | 500 | 590 | 545 |
| Particle size > 250 μm (% by weight) | 15 | (3) | 1 | 0.5 | 1 | 1 | 0.2 |
| Particle size < 63 μm (% by weight) | 4 | (3) | 5 | 3 | 5 | 8 | 7 |
| Speck count | 56 | (2) | 3 | 3 | 8 | 10 | 3 |
| Flow (seconds) | 14 | (2) | 10 | 10 | 11 | 8 | 9 |

[1] Estimated values
[2] No data in the state of the art
[3] Very fine; average particle size 73 μm

We claim:

1. A continuous process for the production of a vinyl chloride polymer by homopolymerization, or copolymerization in the presence of at least one monomer which can be copolymerized with vinyl chloride, or graft polymerization of vinyl chloride in the presence of at least one polymer which can be graft polymerized with vinyl chloride in aqueous suspension in the presence of at least one activator which decompose to form free radicals and of at least one suspending agent in at least two zones, the mixture being cooled, released from pressure and freed from unreacted monomers after leaving the last zone and, after the removal of the bulk of the aqueous liquid, being processed to give a dry polymer powder, which comprises agitating the polymerization mixture in the first zone at a volume-specific stirrer power of 0.6 to 6 kWm$^{-3}$ until a vinyl chloride monomer conversion of 0 to 3 percent by weight has been reached, in an apparatus, at a number of theoretical cascade stages of 3 to 20 and at average dwell times of the polymerization mixture of 5 to 60 minutes and agitating the polymerization mixture in the second zone at a volume-specific stirrer power of 0.01 to 0.6 kWm$^{-3}$ in an apparatus, at a number of theoretical cascade stages of 10 to 100 and carrying out polymerization at temperatures of 40° to 80° C. until a conversion of 70 to 98% by weight has been reached.

2. The process as claimed in claim 1, wherein the polymerization mixture remains in the first zone only until a conversion of 0 to 0.5% by weight has been reached.

3. The process as claimed in either of claims 1 to 2, wherein the polymerization mixture is agitated in the first zone at a number of theoretical cascade stages of 5 to 10.

4. The process as claimed in either of claims 1 or 2, wherein the average dwell time of the polymerization mixture in the first zone is 10 to 30 minutes.

5. The process as claimed in either of claims 1 or 2, wherein the number of theoretical cascade stages and the average dwell time in the first zone are so adjusted that the product of these two quantities is 30 to 300 minutes.

6. The process as claimed in either of claims 1 or 2, wherein the polymerization mixture is agitated in the first zone at a volume-specific stirrer power of 1 to 3 kWm$^{-3}$.

7. The process as claimed in either of claims 1 or 2, wherein the polymerization mixture in the first zone is kept between 15° C. and a temperature 10° C. less than the polymerization temperature in the second zone.

8. The process as claimed in either of claims 1 or 2, wherein, the polymerization mixture is agitated in the second zone at a number of theoretical cascade stages of 15 to 50.

9. The process as claimed in either of claims 1 or 2, wherein the polymerization mixture is agitated in the second zone at a volume-specific stirrer power of 0.02 to 0.2 kWm$^{-3}$.

10. The process as claimed in either of claims 1 or 2, wherein agents for preventing deposits on the walls of the reaction space are used in the second zone.

11. The process is claimed in either of claims 1 or 2, wherein polymerization is carried out in the presence of 0.05 to 3.0% by weight, relative to monomers employed, of at least one polyvinyl alcohol which contains acetate groups and which has a saponification number of 140 to 560 and a weight average molecular weight of 10,000 to 100,000 the quantity of this polyvinyl alcohol amounting to 100 to 50% by weight, relative to the quantity of all the suspending agents present in the polymerization.

12. A continuous process for suspension polymerization, in a plurality of zones, of a polymerization mixture comprising vinyl chloride monomer, an aqueous liquor for suspension polymerization, and an activator capable of decomposing to form free radicals, said process comprising:

agitating the polymerization mixture in the first zone at a volume-specific stirrer power of 0.6 to 6 Kwm$^{-3}$ until a vinyl chloride monomer conversion of 0 to 3 percent by weight has been reached, in an apparatus, at a number of theoretical cascade stages of 3 to 20 and at average dwell times of the polymerization mixture of 5 to 60 minutes;

agitating the polymerization mixture in the second zone at a volume-specific stirrer power of 0.01 to 0.6 kWm$^{-3}$ in an apparatus, at a number of theoretical cascade stages of 10 to 100 and carrying out polymerization at temperatures of 40° to 80° C. until a conversion of 70 to 98% by weight has been reached; and removing the aqueous liquor and unreacted monomer from the polymerization mixture to obtain a dry polymer powder after said conversion of 70 to 98% by weight has been reached.

* * * * *